United States Patent
Barajas Gonzalez et al.

(10) Patent No.: US 11,176,097 B2
(45) Date of Patent: Nov. 16, 2021

(54) ACCELERATED DEDUPLICATION BLOCK REPLICATION

(71) Applicant: INTERNATIONAL BUSINESS MACHINES CORPORATION, Armonk, NY (US)

(72) Inventors: Emmanuel Barajas Gonzalez, Guadalajara (MX); Shaun E. Harrington, Sahuarita, AZ (US); Harry McGregor, Tucson, AZ (US); Christopher B. Moore, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 321 days.

(21) Appl. No.: 15/248,955

(22) Filed: Aug. 26, 2016

(65) Prior Publication Data
US 2018/0060346 A1    Mar. 1, 2018

(51) Int. Cl.
*G06F 16/174*    (2019.01)

(52) U.S. Cl.
CPC ................ *G06F 16/1748* (2019.01)

(58) Field of Classification Search
CPC ........ G06F 3/0641; G06F 16/27; G06F 3/065; G06F 9/4401; G06F 12/08; G06F 11/1453; G06F 16/1748
See application file for complete search history.

(56) References Cited

U.S. PATENT DOCUMENTS

| | | | |
|---|---|---|---|
| 7,054,910 | B1 | 5/2006 | Nordin et al. |
| 7,685,459 | B1 | 3/2010 | De Spiegeleer et al. |
| 7,885,923 | B1 | 2/2011 | Tawri et al. |
| 8,099,571 | B1 | 1/2012 | Driscoll et al. |
| 8,176,269 | B2 | 5/2012 | Jaquette et al. |
| 8,180,740 | B1 | 5/2012 | Stager et al. |
| 8,401,997 | B1 | 3/2013 | Tawri et al. |
| 8,402,250 | B1 | 3/2013 | Juillard |
| 8,478,799 | B2 | 7/2013 | Beaverson et al. |
| 8,478,951 | B1 | 7/2013 | Healey et al. |
| 8,539,148 | B1 | 9/2013 | Chen et al. |
| 8,706,833 | B1 | 4/2014 | Bergant et al. |
| 8,719,225 | B1 | 5/2014 | Rath |

(Continued)

FOREIGN PATENT DOCUMENTS

CN    103152398 A    6/2013

OTHER PUBLICATIONS

List of IBM Patents or Patent Applications Treated as Related dated Aug. 30, 2016 (2 pages).

(Continued)

*Primary Examiner* — Albert M Phillips, III
*Assistant Examiner* — Courtney Harmon
(74) *Attorney, Agent, or Firm* — Griffiths & Seaton PLLC

(57) ABSTRACT

Embodiments for, in a shared storage environment, managing data replication between first and second sites of a distributed computing environment by one or more processors. Metadata is pre-seeded from the first to the second site as an assembled metadata map. Data blocks corresponding to the pre-seeded metadata not currently stored at the second site are determined by the second site using the metadata map within a deduplication environment. A transfer request for the data blocks is returned by the second site to the first site.

9 Claims, 9 Drawing Sheets

(56) References Cited

U.S. PATENT DOCUMENTS

| | | | |
|---|---|---|---|
| 8,799,222 B2 | 8/2014 | Marathe et al. | |
| 8,880,482 B2 | 11/2014 | Akirav et al. | |
| 8,924,354 B2 | 12/2014 | Wang et al. | |
| 9,043,292 B2 | 5/2015 | Nag Yasa et al. | |
| 9,208,166 B2 | 12/2015 | Patterson | |
| 9,235,475 B1 | 1/2016 | Shilane et al. | |
| 9,251,160 B1 | 2/2016 | Wartnick | |
| 9,251,198 B2 | 2/2016 | Mutali et al. | |
| 9,461,895 B1 | 10/2016 | Kardatzke | |
| 9,563,683 B2 | 2/2017 | Abercrombie et al. | |
| 9,798,486 B1* | 10/2017 | Singh | G06F 3/065 |
| 10,120,925 B1* | 11/2018 | Natanzon | G06F 9/45558 |
| 2005/0262167 A1 | 11/2005 | Teodosiu et al. | |
| 2009/0132606 A1 | 5/2009 | Cha et al. | |
| 2010/0088277 A1 | 4/2010 | Rao et al. | |
| 2010/0274772 A1* | 10/2010 | Samuels | G06F 16/188 707/693 |
| 2011/0196822 A1 | 8/2011 | Zunger et al. | |
| 2011/0246734 A1* | 10/2011 | Umbehocker | G06F 3/0608 711/162 |
| 2012/0317084 A1 | 12/2012 | Liu | |
| 2013/0085999 A1 | 4/2013 | Tung et al. | |
| 2014/0040192 A1 | 2/2014 | Patterson | |
| 2014/0297603 A1 | 10/2014 | Kim et al. | |
| 2014/0310250 A1 | 10/2014 | Ben-Shaul et al. | |
| 2014/0351214 A1 | 11/2014 | Abercrombie et al. | |
| 2015/0039571 A1 | 2/2015 | Rao et al. | |
| 2015/0227543 A1 | 8/2015 | Venkatesh et al. | |
| 2015/0269032 A1 | 9/2015 | Muthyala et al. | |
| 2015/0347046 A1* | 12/2015 | Wang | G06F 3/065 711/162 |
| 2016/0004720 A1 | 1/2016 | Tabaaloute et al. | |
| 2016/0048408 A1* | 2/2016 | Madhu | G06F 11/1458 718/1 |
| 2016/0170823 A1* | 6/2016 | Miller | G06F 11/0772 714/56 |
| 2016/0248841 A1 | 8/2016 | Gonzalez et al. | |
| 2017/0031772 A1* | 2/2017 | Subramanian | G06F 3/067 |
| 2017/0364704 A1* | 12/2017 | Wright | G06F 21/6227 |

OTHER PUBLICATIONS

Mandel et al., "Using Hints to Improve Inline Block-layer Deduplication," Proceedings of the 14th USENIX Conference on File and Storage Technologies (FAST '16), Feb. 22-25, 2016 (9 pages).

Anonymous, "Method to Recover Deduce-Data by Writing Metadata behind the Data," An IP.com Prior Art Database Technical Disclosure, IP.com No. IPCOM000246296D, May 25, 2016 (5 pages).

Anonymous, "Peer to Peer data replication in heterogeneous database environments," An IP.com Prior Art Database Technical Disclosure, IP.com No. IPCOM000221575D, Sep. 11, 2012 (3 pages).

Linux Defenders et al., "Reliable, Scalable, and High-Performance Distributed Storage: Distributed Object Storage," An IP.com Prior Art Database Technical Disclosure, IP.com No. IPCOM000234957D, Feb. 19, 2014 (11 pages).

Linux Defenders et al., "Reliable, Scalable, and High-Performance Distributed Storage: Distributed Metadata Management," An IP.com Prior Art Database Technical Disclosure, IP.com No. IPCOM000234959D, Feb. 19, 2014 (10 pages).

Constantinescu et al., "Block Size Optimization in Reduplication Systems," 2009 Data Compression Conference, 2009 (1 page).

* cited by examiner

ACCELERATED DEDUPLICATION BLOCK REPLICATION

BACKGROUND OF THE INVENTION

Field of the Invention

The present invention relates in general to computing systems, and more particularly to, various embodiments for data replication within and/or between distributed computing components.

Description of the Related Art

In recent years, the storage and management of data has shifted dramatically from a local computing location, such as a personal computer or workstation, to centralized systems that may be distributed globally across a wide variety of locations. Hosted, so-called "cloud" data management has become increasingly popular due to a variety of reasons, such as the redundancy of data, the ease of management and lower capital cost of not having to procure storage infrastructure, and other factors.

SUMMARY OF THE INVENTION

Various embodiments for, in a shared storage environment, managing data replication between first and second sites of a distributed computing environment by one or more processors, are provided. In one embodiment, by way of example only, a method for, again in a shared storage environment, managing data replication between first and second sites of a distributed computing environment by one or more processors is provided. Metadata is pre-seeded from the first to the second site as an assembled metadata map. Data blocks corresponding to the pre-seeded metadata not currently stored at the second site are determined by the second site using the metadata map within a deduplication environment. A transfer request for the data blocks is returned by the second site to the first site.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
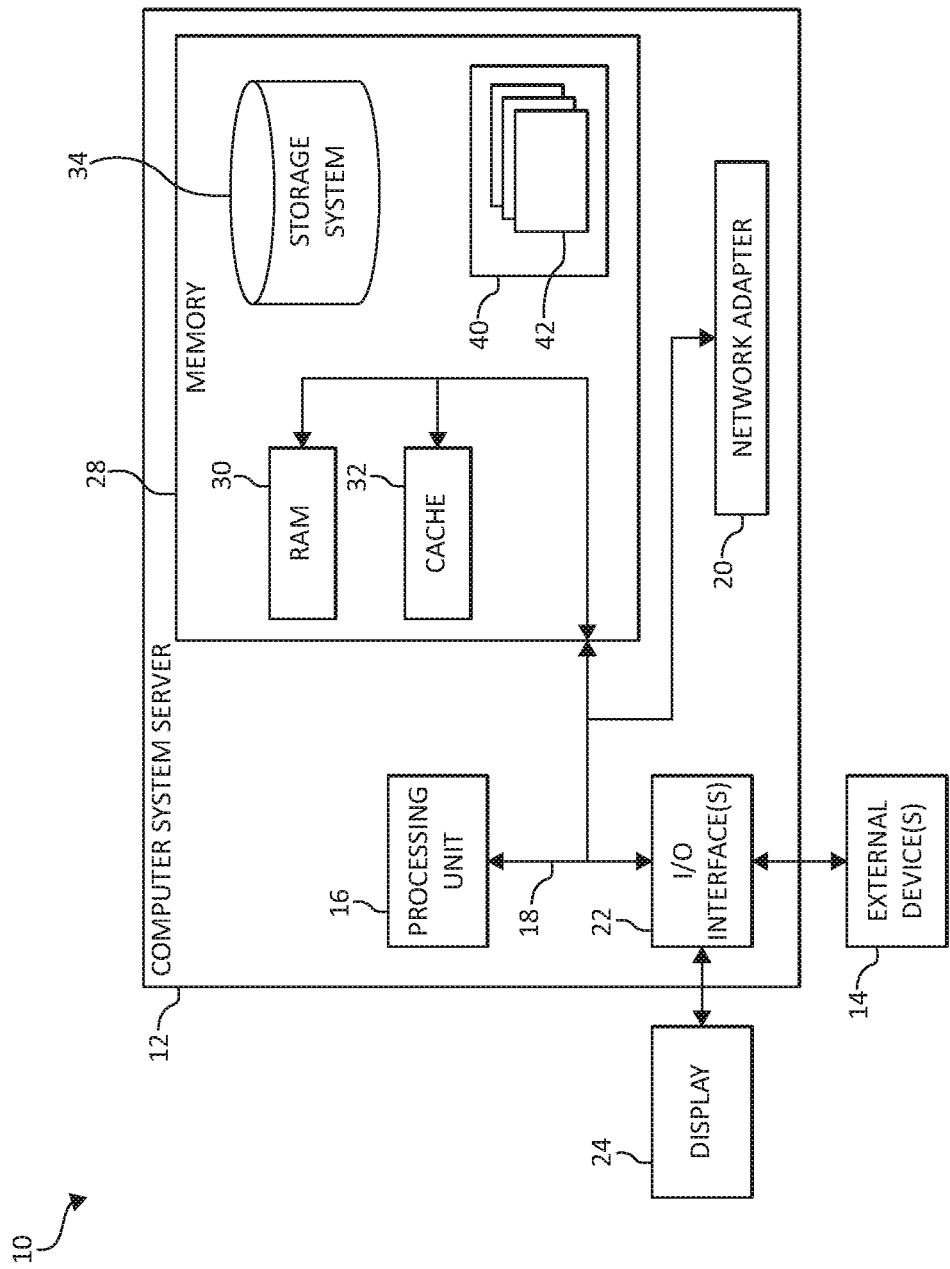
FIG. 1 is a block diagram depicting an exemplary cloud computing node according to an embodiment of the present invention.

As previously indicated, data is increasingly processed through a variety of geographically disbursed computing components, where, for example, a local node may contain a set of data processing components yet remain in remote communication with other portions of the distributed data processing system. To wit, a user's data may not be locally stored or processed on the user's local computer, but is instead hosted by one or more distributed storage components that are in remote communication with the local computer. This type of data storage may, in some cases, be referred to as "cloud," or "cloud-based" storage.

As storage requirements have grown, many techniques for increasing available capacity have evolved. So-called data deduplication allows duplicate copies of data to be minimized to a single physical copy. Data deduplication, traditionally, has been limited to locally-based applications. Because, however, of the potential for deduplication to drastically reduce the amount of physical storage in storage environments, the allure of using deduplication techniques in a wide variety of storage scenarios, and not just in local storage environments, has increased.

Currently, data deduplication implementations are found within environments where data is locally accessible. Data deduplication is generally currently consigned to a system with a dedicated number of disks. For example, a data deduplication implementation may be implemented as part of a local storage system. A device may perform read and write operations to the local storage system, where the incoming and outgoing data passes through a data deduplication mechanism as part of a generalized storage operation that is undertaken on the local storage system.

Localized storage systems with an array of dedicated disks are being phased out in favor of a distributed computing environment, where data may be distributed across many systems within a cloud environment, for example. As previously mentioned, with the advent of cloud-based and other distributive computing systems, the need for a robust data deduplication system that functions across distributed computing components and systems becomes increasingly important. As of yet, however, deduplication functionality has largely not addressed this growing need.

In modern environments, relocating data between locations is generally markedly more challenging than processing data within one location. End users enjoy near ubiquitous connectivity, but in many cases this connectivity is either slow, metered (e.g., pay per bit transferred) or both. While data replication technologies ensure benefits such as data longevity, data security, and so forth, the process of data replication comes at a cost of, among other resources, use of finite network bandwidth. A continuing need exists to implement solutions to provide data deduplication and replication functionality across distributed computing components while minimizing resource consumption.

As will be further described, and to address this continuing need, the mechanisms of the illustrated embodiments implement a local metadata repository to accelerate block data replication utilizing data deduplication technologies, facilitate data backup, and synchronize between end point devices at the universal block layer. Use of a local metadata repository, among other aspects, greatly increases the effective rate that data can be transmitted between, for example, the cloud storage resource and the end user device, while also reducing the actual amount of data that is sent.

The mechanisms of the illustrated embodiments introduce methodologies to enable reduced network bandwidth utilization when transferring deduplicated block data between deduplication sites. In one aspect, only the metadata of the blocks to be transferred to the receiver site is initially transmitted. The receiving site will analyze the metadata, and determine which blocks that the receiver site does not already have within the receiving deduplication environment. The receiver site then returns with a transfer request for only the necessary blocks to complete the replication request. Only the blocks of data that the receiver identified as missing are then transferred from the initiating site.

In another aspect, the mechanisms of the illustrated embodiments present methodologies of predetermining which block-data already exists in a remote storage system when performing a remote block-data transfer. When performing a block-data transfer, these mechanisms will provide an assembled "metadata map" as will be further described to the destination system, which will be responsible for replying with a listing of blocks that do not already exist locally on the destination system. The destination global metadata map is precalculated on the destination storage system, so that a simple analysis may occur upon transfer requests. These foregoing mechanisms carry with them the potential to drastically reduce block-data transfer time and the amount of data sent over the wire to remote storage sites, without requiring additional storage and bandwidth for metadata on the sending system.

In another aspect, and in similar fashion to the block-based mechanisms discussed previously, the mechanisms of the illustrated embodiments present methodologies of pre-determining which objects already exist in a remote storage system when performing a remote object data transfer. When performing an object data transfer, these mechanisms will provide an assembled metadata map as will be further described to the destination system, which will be responsible for replying with a listing of objects and sub-objects (e.g., object parts) that do not already exist locally on the destination system. Here again, the destination global metadata map is precalculated on the destination storage system, so that a simple analysis may occur upon transfer requests.

In similar fashion to the block-based mechanisms discussed previously, the instant mechanisms carry with them the potential to drastically reduce objects to be transferred and transfer time, and the amount of data sent over the wire to remote storage sites, without requiring additional storage and bandwidth for metadata on the sending system. The functionality associated with the block-based mechanisms and object-based mechanisms previously described, along with other aspects of the illustrated embodiments will be described in further detail below.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
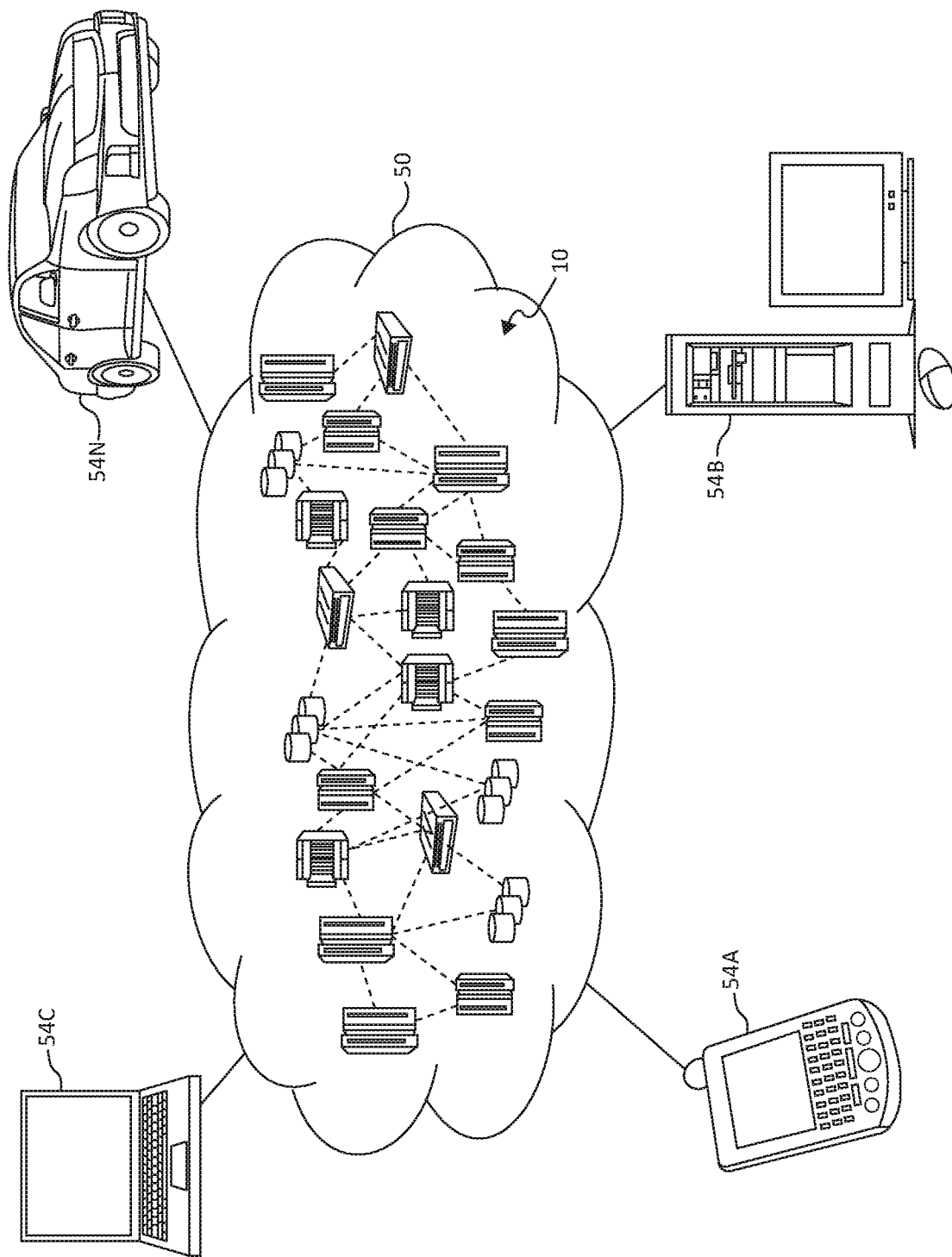
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
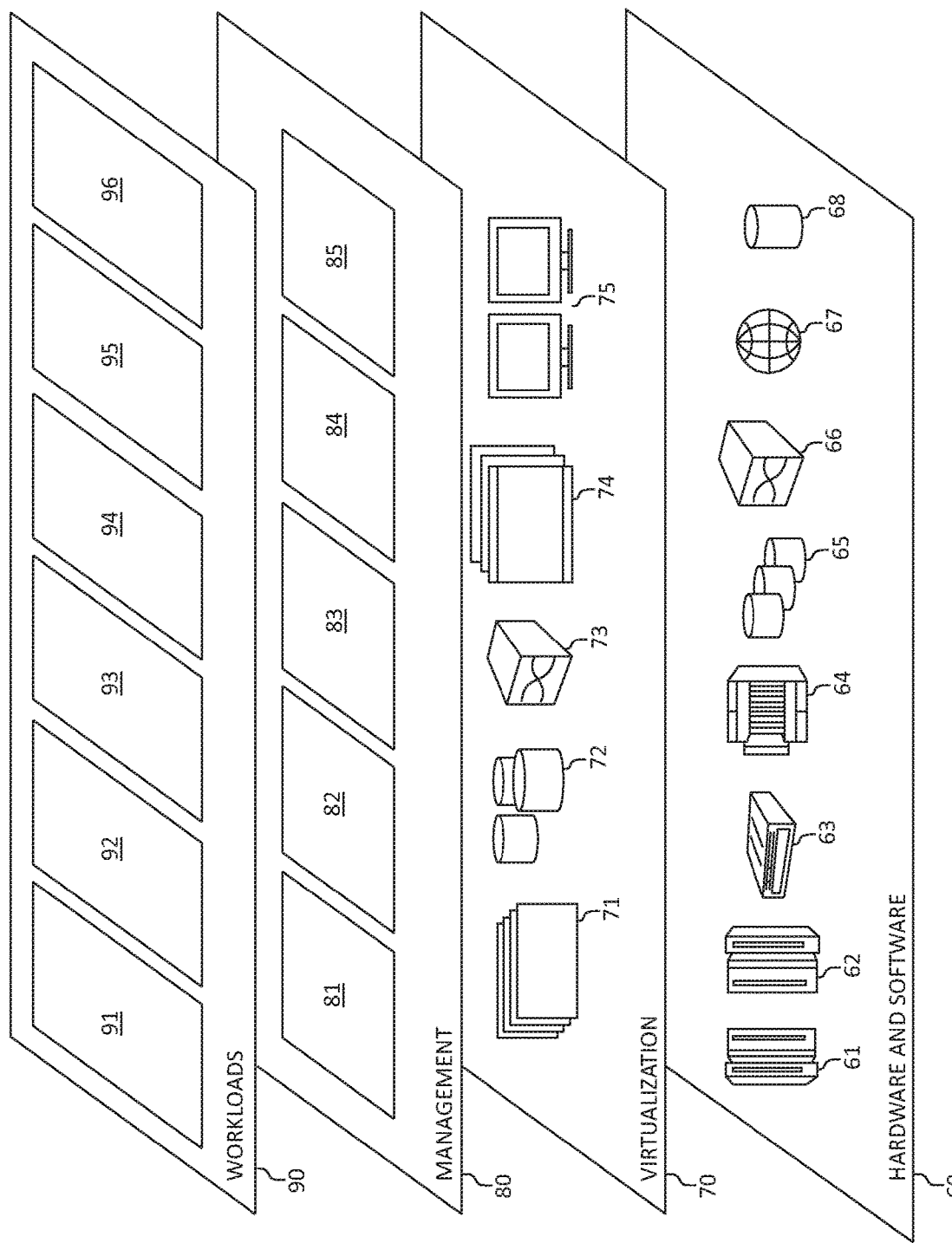
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various data replication workloads and functions 96. In addition, data replication workloads and functions 96 may include such operations as metadata analytics, metadata analysis, and as will be further described, data deduplication operations. One of ordinary skill in the art will appreciate that the data replication workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
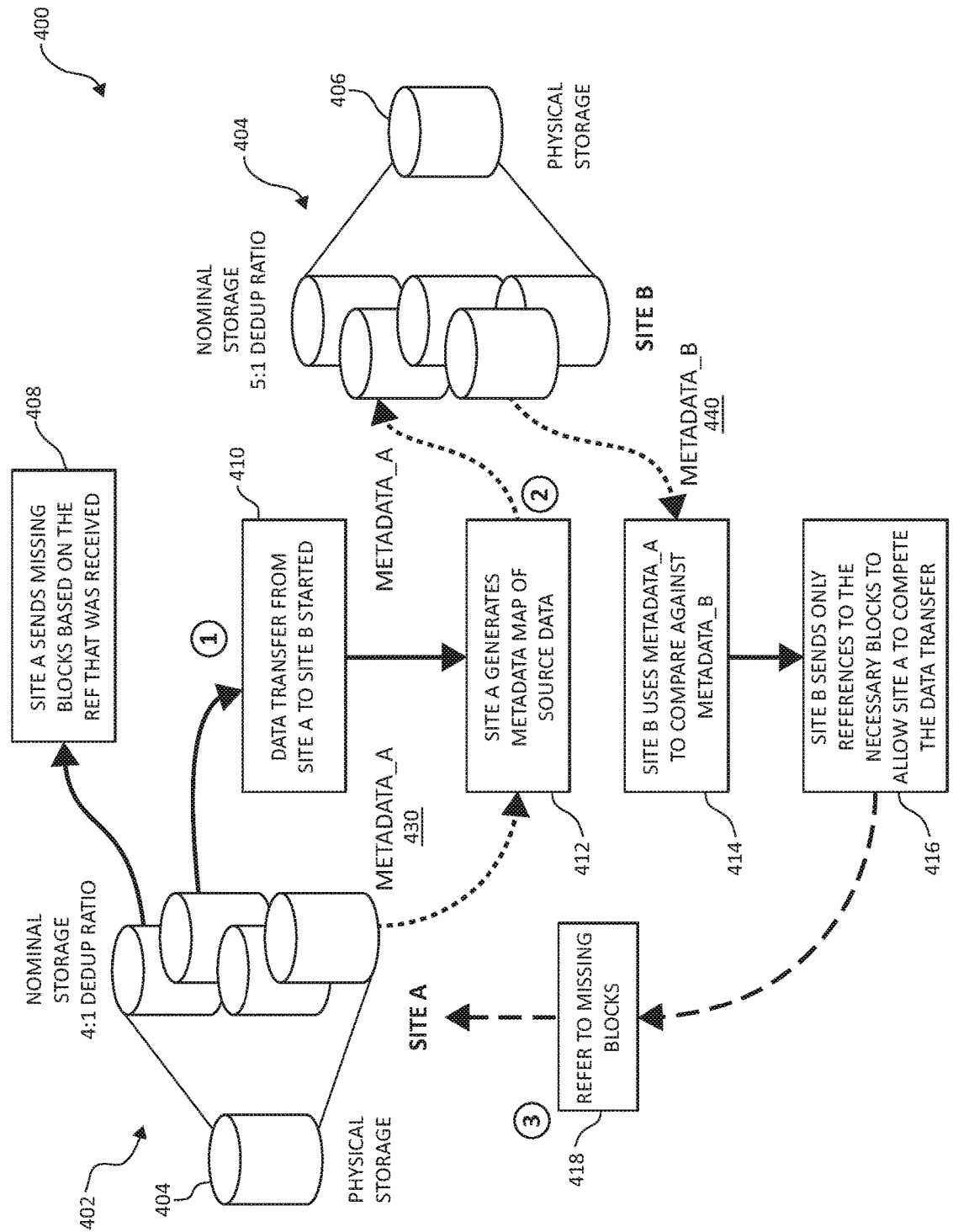
FIG. 4 is a block/flow diagram illustrating various computing components functioning in an exemplary flow in accordance with various aspects of the present invention.

Turning now to FIG. 4, a block diagram depicting exemplary functional components 400 according to various mechanisms of the illustrated embodiments in an exemplary flow, is shown. In one aspect, the mechanisms of the illustrated embodiments implement various functionality between two sites, referred to herein as a "sending system" or "local system" (e.g., Site A/Site 1) and a "receiving system" or "remote system" (e.g., Site B/Site 2). The various data replication aspects of the illustrated embodiments, as will be further described, may take place within particular deduplication computing environments in each particular site or system. In one embodiment, the "sending system" executes in conjunction with the local block storage system, while the "receiving system" executes in conjunction with the remote block storage system.

In one aspect, when a block-group or volume replication request is received, either by an automated process or a user request, the sending system assembles a metadata map containing the deduplication metadata specific to the particular received replication request. The sending system replicates the metadata map to the receiving system, in lieu of transferring block-data corresponding to the replication request. Assembling and sending corresponding metadata potentially alleviates the necessity of sending all block data requested by the receiving system, thus reducing available network bandwidth and otherwise needlessly consuming resources, as will be further described.

The receiving system then accepts the metadata map and performs an analysis against all of the receiving system's deduplication metadata. This process may, as will be described, proceed as a global process to the receiving system. In other words, all volumes, blocks, and other data structures accessible to the receiving system may be scanned, and compared against the received assembled metadata map to identify missing block data. In many cases, the receiving system may locate block data locally. Accordingly, the remaining, missing block data not accessible to the receiving system is catalogued by the receiving system. In one embodiment, the receiving system may utilize a locally based metadata map corresponding to all of the globally accessible data structures accessible to the receiving system in a precalculated manner. As a result, the receiving system may more quickly and efficiently identify missing block data to be subsequently requested to the sending system's deduplication environment.

As a subsequent step, the receiving system then sends a block data request including necessary blocks (e.g., Local Block Addresses (LBAs) to the sending system. Based on the unique data block request (again, e.g., LBAs) from the receiving system, the sending system begins transmission of only those blocks. Upon replication completion, the metadata maps are re-compared to ensure consistent replication of the deduplicated data.

Returning now to FIG. 4, exemplary functionality 400 includes a number of virtualized volumes 402 of block-based data stored at Site A as shown in a particular deduplication environment (here, for example having a nominal storage 4:1 deduplication ratio). Associated with the virtualized volumes 402 is the actual physical storage volume 404.

As a first step, a replication process is started (e.g., data transfer) between site A and site B (functionality 410). Site A then generates a corresponding metadata map of source block-based data (functionality 412), in which metadata_A (assembled metadata map 430) is supplied. As a second step, the assembled metadata map 430 is supplied to the Site B, which also includes virtualized volumes 404 of block-based data, corresponding to physical storage volume 406. The remote Site B then performs the comparative analysis previously described, to identify missing block data by comparing the metadata 430 with metadata_B (440) as shown by functionality 414.

Once the comparative analysis is performed, and missing block data is identified, site B sends only references to the necessary blocks to allow the Site A to complete the data transfer (functionality 416). As previously described, the aforementioned process then saves network bandwidth and resources, as the Site A then uses the references to the necessary blocks (functionality 418) and only sends those missing blocks based on the references that were received (functionality 408).

Figure 5A:
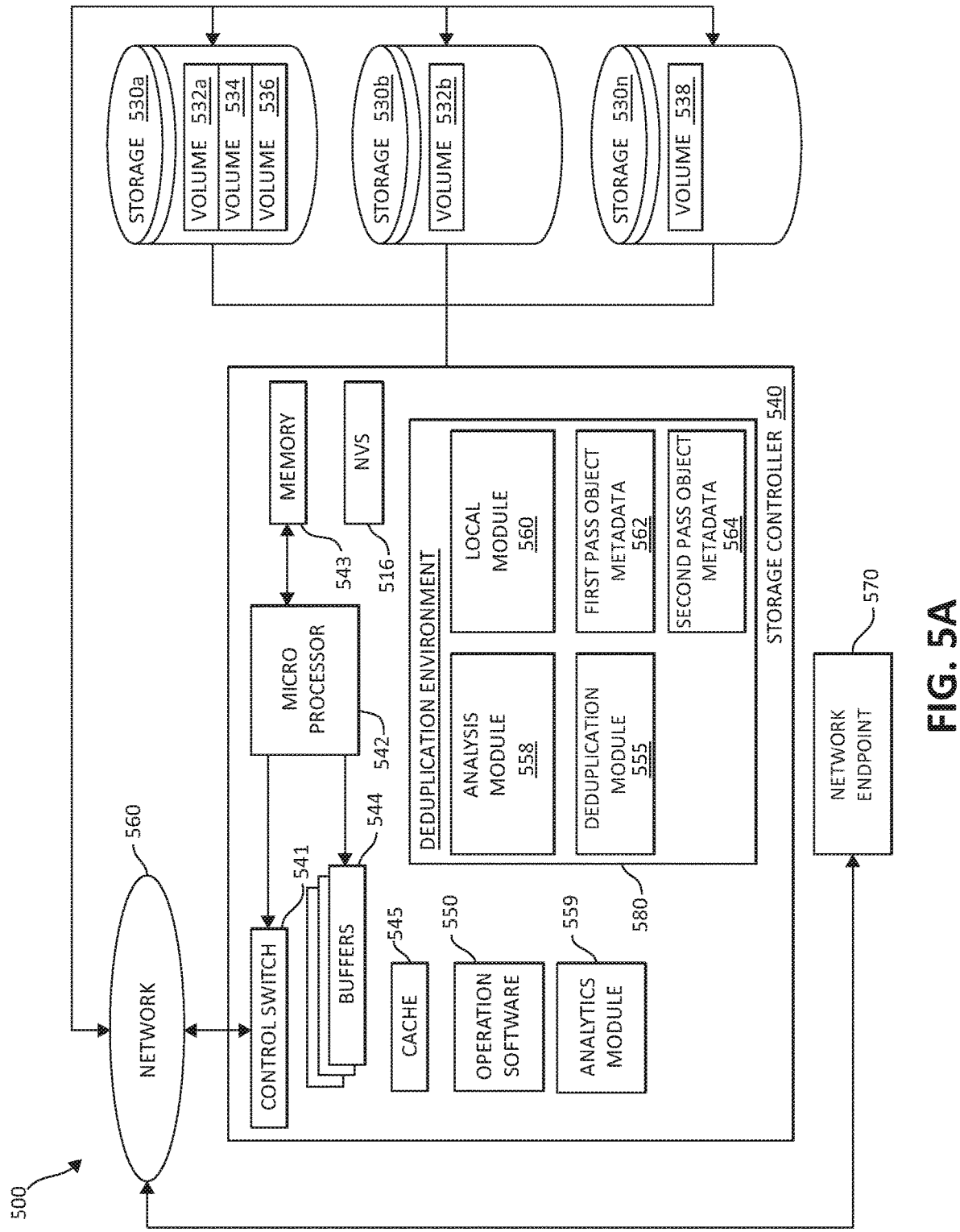
FIG. 5A is an additional block diagram depicting an exemplary hardware structure at a local site, operational in an overall context of distributed computing components, for managing data replication within and between distributed computing components by one or more processors, in which aspects of the present invention may be realized.
Figure 5B:
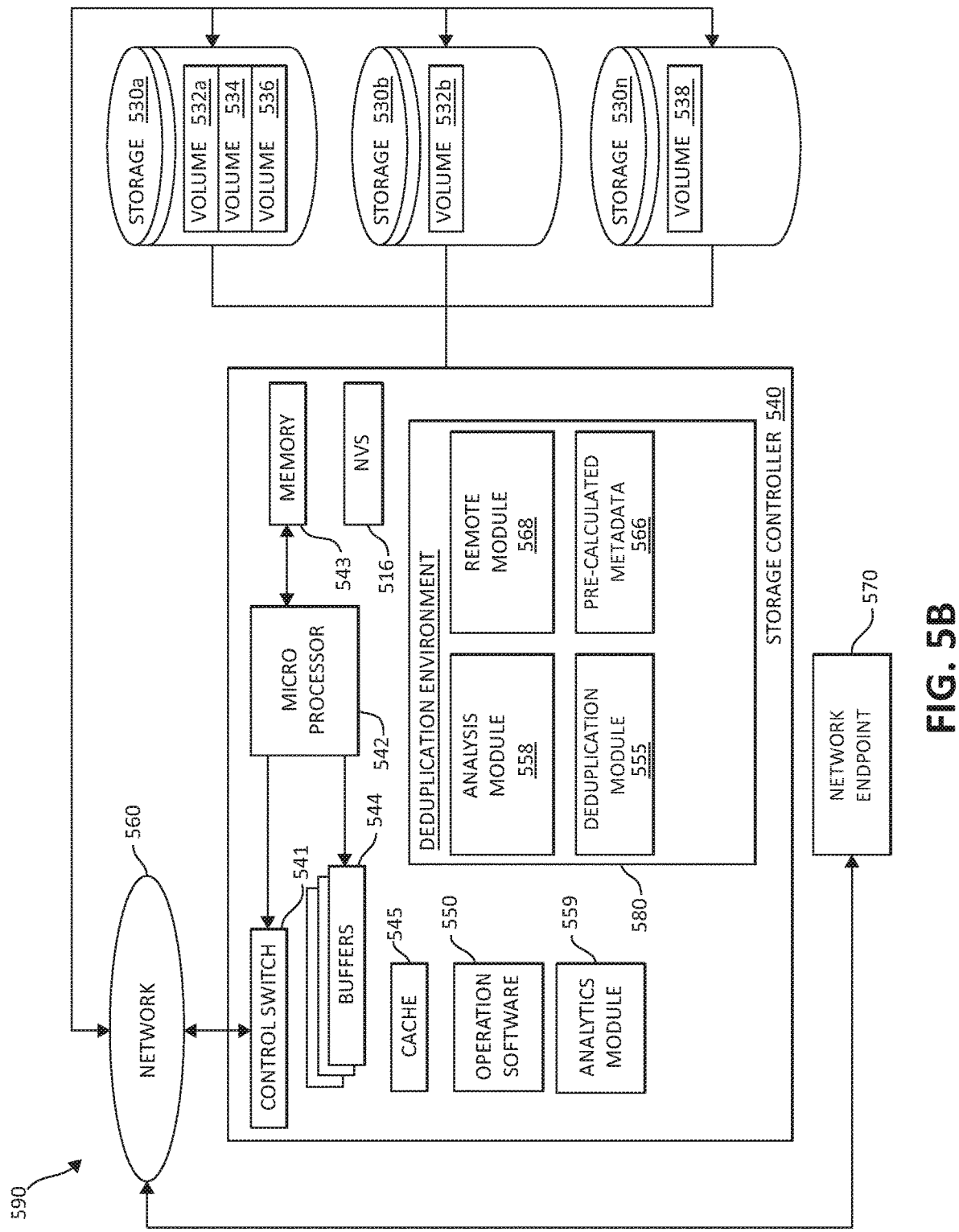
FIG. 5B is an additional block diagram depicting an additional exemplary hardware structure at a remote, destination site, operational in an overall context of distributed computing components, for managing data replication within and between distributed computing components by one or more processors, in which aspects of the present invention may be realized.

FIGS. 5A and 5B, following, are additional block diagrams showing hardware structures of data management systems 500 and 590, respectively, that may be used in the overall context (i.e., as a portion of a distributed computing environment) of performing functionality according to various aspects of the present invention. The data management system 500 depicted in FIG. 5A represents, in one embodiment, a representation of at least a portion of a sending system, or a local system, in a two-site replication circuit. As will be further described, the data management system 590 in FIG. 5B represents, in one embodiment, a representation of at least a portion of a receiving system, or a remote system in the two-site replication circuit.

Turning first to FIG. 5A, network 560 may be a fibre channel (FC) fabric, a fibre channel point-to-point link, a fibre channel over Ethernet (FCoE) fabric or point to point link, a FICON or ESCON I/O interface, any other I/O interface type, a wireless network, a wired network, a LAN, a WAN, heterogeneous, homogeneous, public (i.e. the Internet), private, or any combination thereof. The ISP may provide local or distributed data among one or more locations and may be equipped with any type of fabric (or fabric channel) (not shown in FIG. 5A) or network adapter 560 to the storage controller 540, such as Fibre channel, FICON, ESCON, Ethernet, fiber optic, wireless, or coaxial adapters. Network management system 500 is accordingly equipped with a suitable fabric (not shown in FIG. 5A) or network adaptor 560 to communicate.

To facilitate a clearer understanding of the methods described herein, storage controller 540 is shown in FIG. 5A as a single processing unit, including a microprocessor 542, system memory 543 and nonvolatile storage ("NVS") 516. It is noted that in some embodiments, storage controller 540 is comprised of multiple processing units, each with their own processor complex and system memory, and interconnected by a dedicated network 560 within data storage system 500.

In a local or remote location, yet connected over network 560, storage 530 (labeled as 530a, 530b, and 530n herein) may be comprised of one or more storage devices, such as storage arrays, which are connected to storage controller 540 (e.g., by a storage network) as shown.

In some embodiments, the devices included in storage 530 may be connected in a loop architecture. Storage controller 540 manages storage 530 and facilitates the processing of write and read requests intended for storage 530. The system memory 543 of storage controller 540 stores program instructions and data, which the processor 542 may access for executing functions and method steps of the present invention for executing and managing storage 530 as described herein. In one embodiment, system memory 543 includes, is in association with, or is in communication with the operation software 550 for performing methods and operations described herein. As shown in FIG. 5A, system memory 543 may also include or be in communication with a cache 545 for storage 530, also referred to herein as a "cache memory," for buffering "write data" and "read data," which respectively refer to write/read requests and their associated data. In one embodiment, cache 545 is allocated in a device external to system memory 543, yet remains accessible by microprocessor 542 and may serve to provide additional security against data loss, in addition to carrying out the operations as described herein.

In some embodiments, cache 545 is implemented with a volatile memory and non-volatile memory and coupled to microprocessor 542 via a local bus (not shown in FIG. 5A) for enhanced performance of data storage system 500. The NVS 516 included in data storage controller 540 is accessible by microprocessor 542 and serves to provide additional support for operations and execution of the present invention as described in other figures. The NVS 516, may also be referred to as a "persistent" cache, or "cache memory" and is implemented with nonvolatile memory that may or may not utilize external power to retain data stored therein. The NVS 516 may be stored in and with the cache 545 for any purposes suited to accomplish the objectives of the present invention. In some embodiments, a backup power source (not shown in FIG. 5A), such as a battery, supplies NVS 516 with sufficient power to retain the data stored therein in case of power loss to data storage system 500. In certain embodiments, the capacity of NVS 516 is less than or equal to the total capacity of cache 545.

Storage 530 may be physically comprised of one or more storage devices, such as storage arrays. A storage array is a logical grouping of individual storage devices, such as a hard disk. In certain embodiments, storage 530 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 5A may include a logical volume, or simply "volume," may have different kinds of allocations. Storage 530a, 530b and 530n are shown as ranks in data storage system 500, and are referred to herein as rank 530a, 530b and 530n. Ranks may be local to data storage system 500, or may be located at a physically remote location. In other words, a local storage controller may connect with a remote storage controller and manage storage at the remote location. Rank 530a is shown configured with two entire volumes, 534 and 536, as well as one partial volume 532a. Rank 530b is shown with another partial volume 532b. Thus volume 532 is allocated across ranks 530a and 530b. Rank 530n is shown as being fully allocated to volume 538—that is, rank 530n refers to the entire physical storage for volume 538. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

A network endpoint 570 is connected through the network 560 as shown. The network endpoint 570 is generically intended to refer to any number of network devices, such as a switch, a router, a wireless access point, or another device known generally to one of ordinary skill in the art. As will be further illustrated in the following figures, a user may use a networked device, (e.g., a device connected to network 560) to access the network 560. The networked device may include computers, tablets, smartphones, television set top boxes, televisions and other video equipment, or even a household appliance such as a refrigerator or a garage door opener, again as one of ordinary skill in the art will appreciate. Ultimately any device having communicative ability to and through network 560 is anticipated to use the network endpoint 570. In one embodiment, the depiction of a network endpoint 570 serves to provide a point where an input object (data object) is introduced into a distributed computing environment, as will be described.

The storage controller 540 includes a deduplication and replication environment 580, which may include a deduplication module 555, an analysis module 558, a local module 560, and block and/or object metadata 562 and 564 (e.g., hash tables of information as will be further described), among other functional components. First and second pass metadata functionality as depicted as 562 and 564 will be further described, following.

The deduplication module 555, analysis module 558, local module 560, and metadata 562, 564 may operate in conjunction with each and every component of the storage controller 540, and storage devices 530. The deduplication module 555, analysis module 558, local module 560, and metadata 562, 564 may be structurally one complete module or may be associated and/or included with other individual modules. The deduplication module 555, analysis module 558, local module 560, and metadata 562, 564 may also be located at least partially in the cache 545 or other components, as one of ordinary skill in the art will appreciate.

The deduplication module 555, analysis module 558, local module 560, and metadata 562, 564 may individually and/or collectively perform various aspects of the present invention as will be further described. For example, the deduplication module 555 may perform various deduplication and replication operations in accordance with aspects of the illustrated embodiments, such as designating certain duplicate data with a reference to the physical location of the data in lieu of a duplicate instance of physical storage, or preparing deduplicated object data for transfer to another site. The analysis module 558 may use data analytics to identify, organize, create, delete, sequester, or perform other actions on various patterns, trends, and other characteristics identified in the tracked data over the network 560 and between other distributed computing components in the distributed computing environment. Local module 560 may perform various seed updates and management operations, such as syncing seed information contained in the object storage environment with that of a local user, and so forth. Finally, each of the various metadata entries (as will be described), may be stored, organized, retrieved, and deleted in the metadata 562, 564. As one of ordinary skill in the art will appreciate, the deduplication module 555, analysis module 558, local module 560, and metadata 562, 564 may make up only a subset of various functional and/or functionally responsible entities in the data storage system 500.

Other ancillary hardware may be associated with the storage system 500. For example, as shown, the storage controller 540 includes a control switch 541, a microprocessor 542 for controlling all the storage controller 540, a nonvolatile control memory 543 for storing a microprogram (operation software) 550 for controlling the operation of storage controller 540, data for control, cache 545 for temporarily storing (buffering) data, and buffers 544 for assisting the cache 545 to read and write data, a control switch 541 for controlling a protocol to control data transfer to or from the storage devices 530, the deduplication module 555, analysis module 558, local module 560, seeds 562, or other blocks of functionality, in which information may be set. Multiple buffers 544 may be implemented with the present invention to assist with the operations as described herein.

Turning now to FIG. 5B, and as previously described, an additional block diagram of a hardware structure 590 is depicted, showing various components of what may be referred to herein as a receiving system or remote system (e.g., the data storage/deduplication/replication environment on the receiving side of a deduplication and replication operation).

For the sake of brevity, many of the components previously described in FIG. 5A may be also found in the hardware structures 590, including the portion of the network 560, cache 545, and the like, and in particular, the deduplication environment 580. These components perform similar functionality to the functionality previously described. The storage controller 540 in the receiving system shown may incorporate an analysis module 558 and deduplication module 555 as previously described. In the depicted embodiment, the storage controller 540 also incorporates a remote module 568 and pre-calculated metadata 566.

In the depicted embodiment, pre-calculated metadata 566 corresponds to data structures (blocks, objects, sub-objects) that are globally accessible to the remote system 590. As previously described the various components of the remote system may analyze any accessible data structures to the system as a global process, and assemble a pre-calculated metadata map corresponding to those data structures. As one of ordinary skill in the art will appreciate, the pre-calculated metadata may be organized in various forms in particular settings, such as by block-based metadata, object-based metadata, sub-object based metadata, or metadata corresponding to particular storage virtualizations or any number of possible methodologies. Ultimately, and as previously described, one exemplary purpose of having the pre-calculated metadata allows for a rapid examination/comparison of incoming metadata maps from the sending system 500 such that missing data structures are quickly identified.

In view of the foregoing description of various exemplary hardware (e.g., hardware 500 and 590) components that may be implemented to accomplish various aspects of the present invention, consider the following further exemplary implementations of functionality accomplishing the various inventive aspects in several additional embodiments.

In an additional embodiment, the mechanisms of the present invention may operate on a block-based level, by performing block-based data deduplication and replication functionality as further described. For example, the user or an automated replication process may first identify a selected block-set for replication to a destination storage system. These blocks then undergo a local metadata generation process taking into account a pre-determined block-size for transfer. This newly created metadata map is reduced to only a list of only the unique metadata on the system which is then transferred to the destination storage system.

In a subsequent step, the destination storage system performs a comparison of the transmitted metadata list to determine what blocks already exist in the destination storage environment. As previously indicated, this may proceed as a global process for the destination storage system, and is not limited to specific volumes, pools, or groups of block-data. By increasing the size of the remote data pool, the system enhances the data reduction for the subsequent transfer by increasing probability of a match. Upon determination by the destination system, the missing block list is compressed and transmitted from the destination storage system to the requesting system.

Continuing the exemplary embodiment further, in view of the transmission of unique block-data based on the destination storage system's analysis, the requesting system generates a meta-data map of all requested unique blocks identified by the destination storage system. The requesting system transmits only the identified unique blocks of data and the full metadata map including the deduplicated data location to the destination storage system. The destination storage system incorporates the metadata map that was transmitted into the destination system's global metadata repository.

In a further subsequent step, the destination storage system uses the metadata map to store the data appropriately. Upon successful completion of the transfer, the appropriate metadata map for the transferred blocks are incorporated into the destination storage system's global meta-data repository, along with the location information for the where the blocks exist. The remote storage system will be able to immediately utilize the newly expanded global meta-data repository.

In a still further embodiment, the mechanisms of the present invention may operate on an object-based level, by performing object-based and sub-object-based data deduplication and replication functionality as further described. For example, the user or an automated replication process may first identify a select object-set for replication to a destination storage system. These objects then undergo a first pass local metadata generation process for transfer. Metadata (hashes) are calculated per object. This first pass assembled metadata map is previously indicated in FIG. 5A as metadata 562.

This newly created meta-data map is reduced to a list of only the unique object metadata on the system which is then transferred to the destination storage system. The destination storage system performs a comparison of the transmitted metadata list to determine what objects already exist in the destination storage environment. Here again, this is a global process for the destination storage system, and is not limited to specific volumes, pools, or groups of object-data, and increases the probability of a match by implementing a globalized search for any and all accessible data structures.

Upon determination, the missing object list is compressed and transmitted from the destination storage system to the requesting system. The remaining objects then undergo a second pass local metadata generation process for transfer. This second pass assembled metadata map is previously indicated in FIG. 5A as metadata 564. The corresponding metadata hashes are calculated per object at the sub-object level, using a pre-determined data size. This newly created metadata map is reduced to a list of only the unique sub-object metadata on the system, which is then transferred to the destination storage system.

The destination storage system performs a comparison of the transmitted metadata list to determine which sub-objects already exist in the destination storage environment. Once again, this is a global process for the destination storage system, and is not limited to specific volumes, pools, or groups of object-data, to increase the chances of finding a particular match. Upon determination, the missing sub-object list is compressed and transmitted from the destination storage system to the requesting system.

Continuing the present exemplary embodiment further, in a subsequent series of steps, the requesting system generates a metadata map of all requested unique objects and missing sub-objects identified by the destination storage system. The requesting system transmits only the identified unique objects and sub-objects of data and the full metadata map including the de-duplicated data location to the destination storage system. The destination storage system incorporates the metadata map that was transmitted into its global metadata repository. The destination storage system uses the metadata map to store the data appropriately.

Upon successful completion of the transfer, the appropriate meta-data map for the transferred objects are incorporated into the destination storage system's global meta data repository, along with the location information for where the objects exist. The remote storage system will be able to immediately utilize the newly expanded global meta-data repository.

Figure 6:
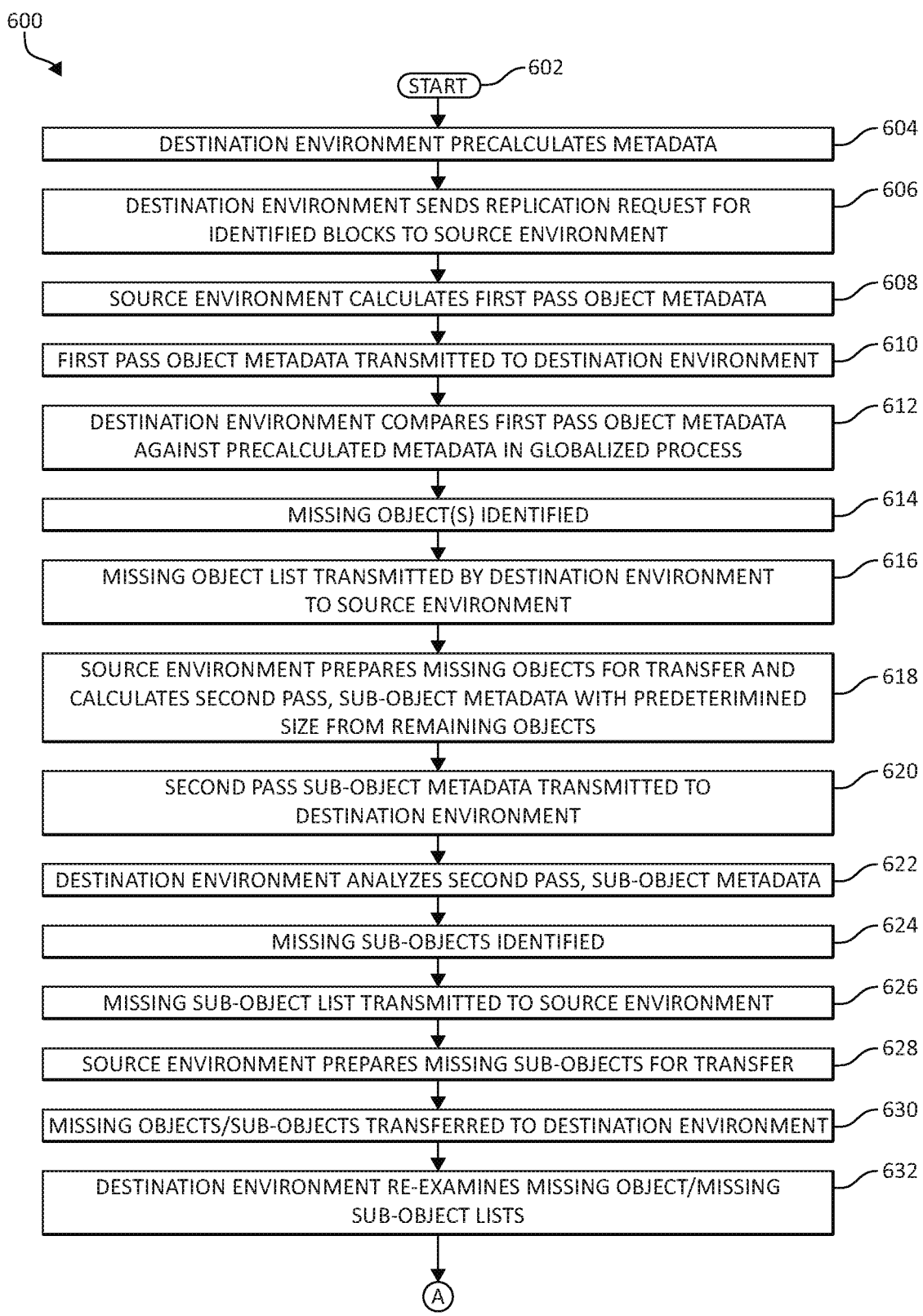
FIG. 6 is a flowchart diagram depicting an exemplary method for managing data replication within and between distributed computing components by one or more processors, again in which aspects of the present invention may be realized.
Figure 6:
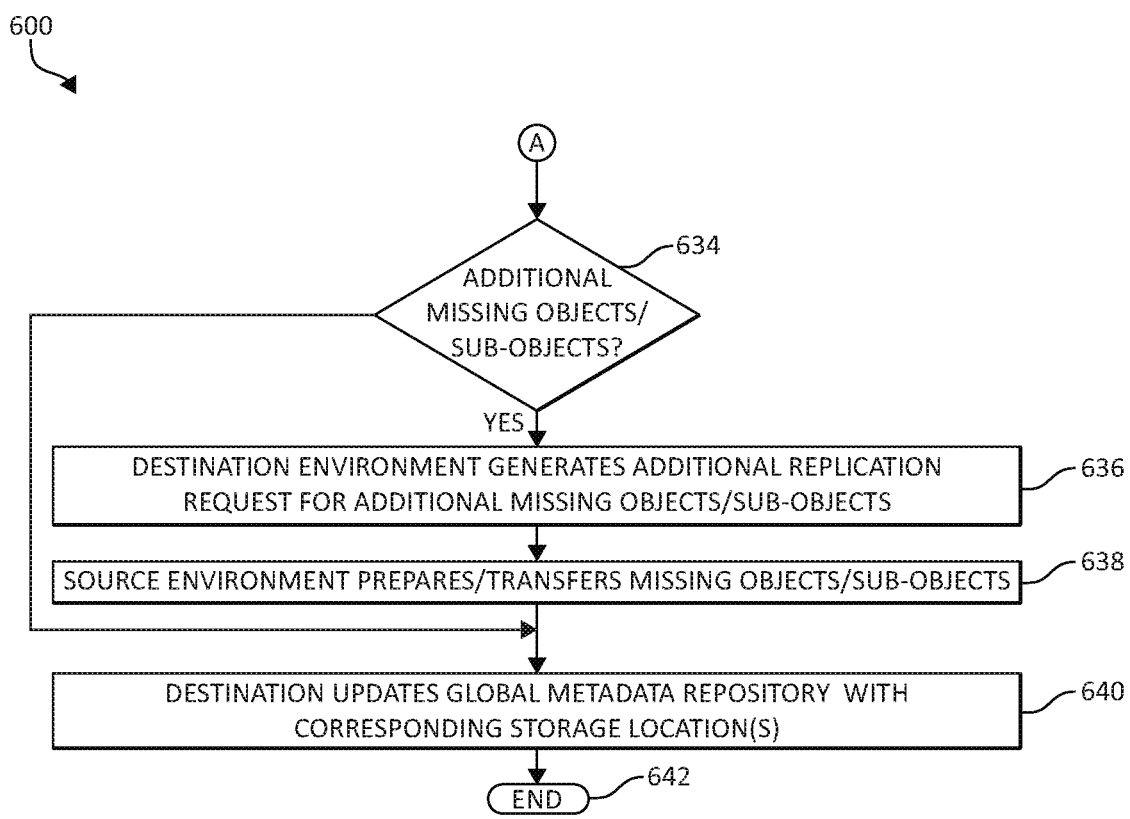

With the foregoing exemplary embodiments in view, consider now FIG. 6, which is a flowchart of an exemplary method for managing data replication within and between distributed computing components by one or more processors, in which various aspects of the illustrated embodiments may be realized. Method 600 begins (step 602) with the pre-calculation of a metadata map corresponding to all data structures globally accessible to the destination environment (step 604) as previously described. At a subsequent time, the destination environment then sends a replication request for identified objects to the source environment (step 606).

The source environment then calculates first-pass object metadata as previously described (step 608), which is transmitted to the destination environment (step 610). The destination environment then compares the first pass object metadata against the recalculated metadata in a globalized process (step 612). Based on the globalized comparison, missing object(s) are identified (step 614). The corresponding missing object list is transmitted by the destination environment to the source environment (step 616).

In a subsequent step 618, the source environment then prepares missing objects for transfer and calculates second pass, sub-object metadata with a predetermined size from the remaining objects. The second pass, sub-object metadata is then transmitted to the destination environment (step 620), where the destination environment analyzes the second pass metadata (step 622) in a similar process to the object analysis, and identifies missing sub-object data structures (step 624), transferring a missing sub-object list to the source environment (step 626).

The source environment then prepares the missing sub-object data structures for transfer (step 628), and the missing objects and sub-objects are transferred to the destination environment (step 630). The destination environment then examines the received files, and reexamines the missing object/missing sub-object lists in lieu of the received data structures (step 632). If still missing data structures are identified (decision step 634), the destination environment generates an additional replication request for the additional missing data structures (step 636), and the source environment prepares and transfers the missing data structures (step 638).

Returning to decision step 634, if all requested missing data is accounted for, the method 600 then moves to step 640, where the destination environment's global metadata repository is updated with the additional data and corresponding storage location(s). The method 600 then ends (step 642).

Figure 7:
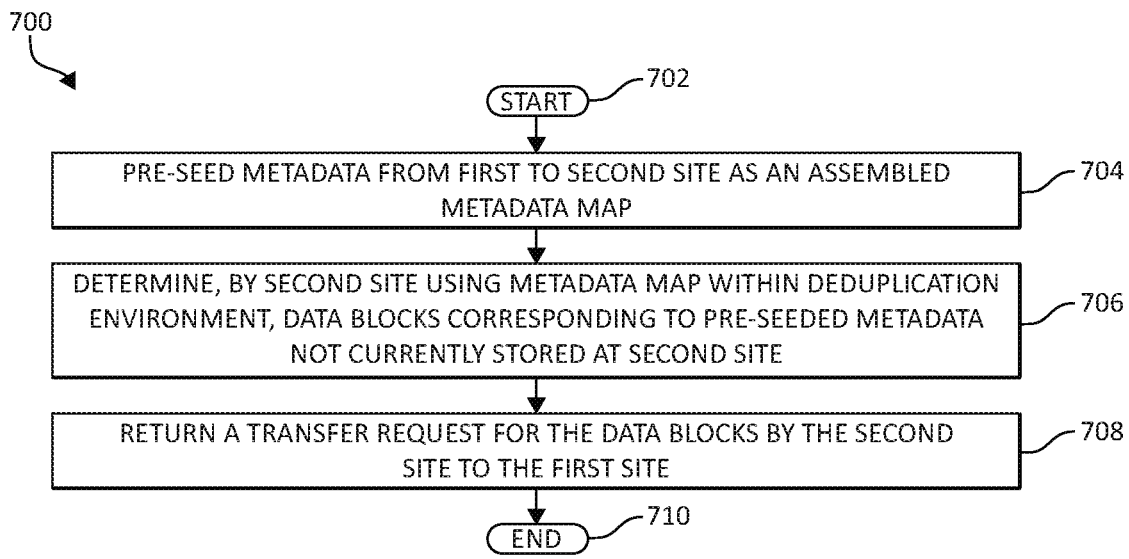
FIG. 7 is an additional flowchart diagram depicting an additional exemplary method for managing data replication within and between distributed computing components by one or more processors, again in which aspects of the present invention may be realized.

Turning now to FIG. 7, an additional flowchart of an additional exemplary method 700 for managing data replication within and between distributed computing components by one or processors is depicted, here again in which various aspects of the illustrated embodiments may be implemented. Method 700 begins (step 702) with the pre-seeding of metadata from a first site to a second site as an assembled metadata map (step 704).

In a subsequent step 706, the second site determines, by comparing the assembled metadata map against metadata precalculated by the second site, data blocks corresponding to the pre-seeded metadata not currently stored at the second site. The second site then returns a transfer request for the data blocks to the first site (step 708), and the method 700 then ends (step 710).

Figure 8:
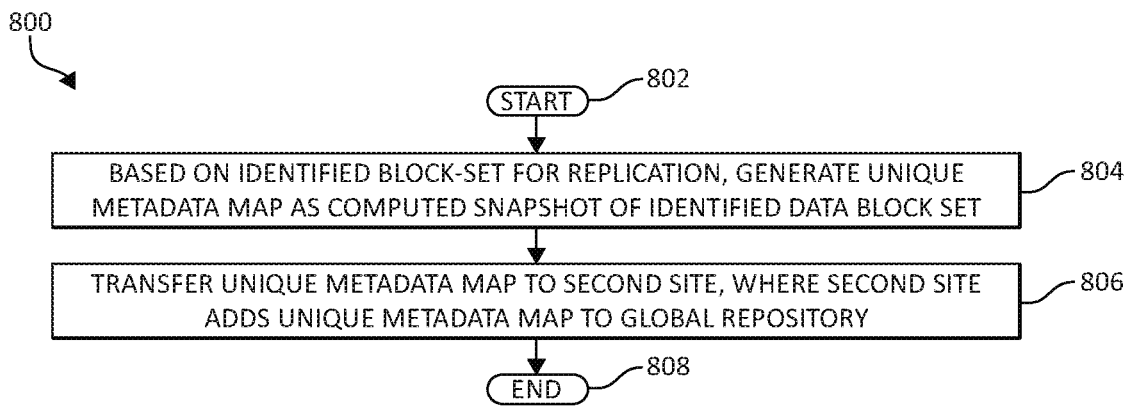
FIG. 8 is an additional flowchart diagram depicting an additional exemplary method for managing data replication within and between distributed computing components by one or more processors, again in which aspects of the present invention may be realized.

Turning now to FIG. 8, an additional flowchart of an additional exemplary method 800 for managing data replication within and between distributed computing components by one or processors is depicted, here again in which various aspects of the illustrated embodiments may be implemented. Method 800 begins (step 802) by generating, based on an identified block-set for replication, a unique metadata map as a computed snapshot of the identified data block-set (step 804). The unique metadata map is transferred to a second site, where the second site adds the unique metadata to a global metadata repository, which is accessible by the second site, the first site, or other repository sites (step 806). The method 800 then ends (step 808).

Figure 9:
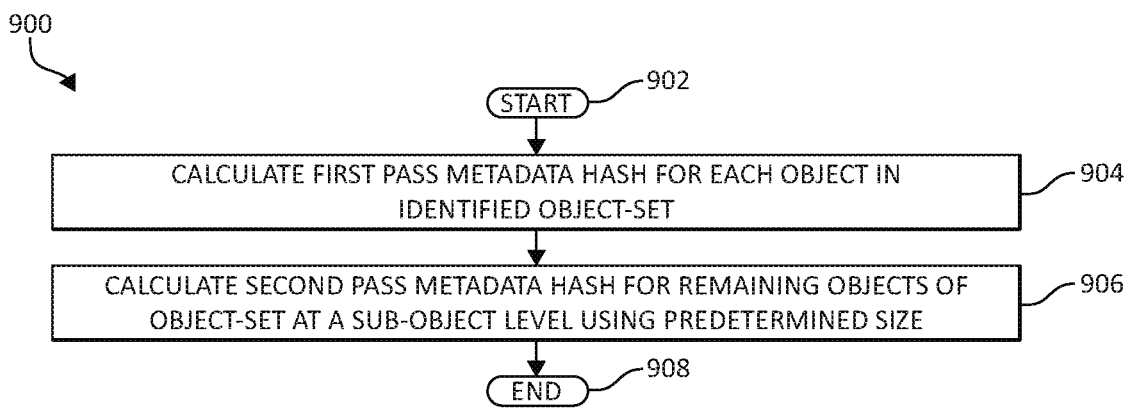
FIG. 9 is an additional flowchart diagram depicting an additional exemplary method for managing data replication within and between distributed computing components by one or more processors, here again in which aspects of the present invention may be realized.

Method 900 in FIG. 9, following, is an additional exemplary flowchart embodiment for managing data replication within and between distributed computing components by one or more processors, here again in which various aspects of the illustrated embodiments may be implemented. Method 900 begins (step 902) with the calculation of first pass metadata hashes for each object in an identified object-set (step 904). As a subsequent step 906, second pass metadata hashes are calculated for remaining objects of the object-set at a sub-object level using a predetermined size. The method 900 then ends (step 908).

By intelligently using calculated and/or precalculated, pre-seeded metadata in combination with deduplication and replication functionality in the context of devices connected through a network to an object storage environment in and between distributed computing components, the mechanisms of the illustrated embodiments improve resource utilization, increase bandwidth, reduce transfer time, enhance data synchronization, and a variety of additional attendant benefits.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. In a shared storage environment, a method for managing data replication between first and second sites of a distributed computing environment by one or more processors, comprising:
    receiving, by the first site comprising a source storage, a replication request for a particular block set requested by a second site comprising a destination storage;
    responsive to receiving the replication request, generating metadata, by the first site, for each block in the particular block set, wherein the metadata generation is performed taking into account a predetermined block size for transferring the particular block set from the first site to the second site;
    responsive to generating the metadata for each block in the particular block set, creating, by the first site, a metadata map using the metadata of the particular block-set, wherein the metadata map contains the metadata of each block specific to the replication request of the particular block set made by the second site;
    pre-seeding the metadata describing the particular block set from the first to the second site as the created metadata map, wherein the metadata describing the particular block set is pre-seeded from the first site to the second site prior to transferring any blocks of the particular block set requested by the second site;
    determining, by the second site using the metadata map within a deduplication environment, data blocks corresponding to the pre-seeded metadata not currently stored at the second site by comparing the metadata of the created metadata map received from the first site of the metadata of only those blocks specific to the requested particular block set to metadata of a pre-calculated metadata map of all data stored at the second site, wherein the pre-calculated metadata map is created using deduplication metadata of all data stored at the second site and stored by the second site prior to receiving the replication request;
    returning, by the second site to the first site, a transfer request for the data blocks, wherein returning the transfer request includes compressing a list of the data blocks determined as not currently stored at the second site and transmitting the compressed list, by the second site to the first site, as an updated replication request;
    responsive to the transfer request, transferring, from the first site to the second site, only original data blocks of the data blocks associated with the particular block-set determined as not currently stored at the second site as identified by the metadata map by the second site, thereby reducing bandwidth utilization during a replication operation of the particular block-set between the first and second site; and
    subsequent to transferring the data blocks from the first to the second site, reexamining, by the second site, the assembled metadata map received from the first site as compared to the pre-calculated metadata map at the second site to determine if each of the data blocks were transferred.

2. The method of claim 1, further including performing, by the second site, an analysis of all accessible data to the second site to determine the data blocks.

3. The method of claim 1, further including, if some of the data blocks are determined not to have been received by the second site, reissuing a replication request to the first site for those data blocks determined not to have been received.

4. In a shared storage environment, a system for managing data replication between first and second sites of a distributed computing environment, comprising:
one or more processors, integrated into a portion of the distributed computing environment, that:
receive, by the first site comprising a source storage, a replication request for a particular block set requested by a second site comprising a destination storage,
responsive to receiving the replication request, generate metadata, by the first site, for each block in the particular block set, wherein the metadata generation is performed taking into account a predetermined block size for transferring the particular block set from the first site to the second site,
responsive to generating the metadata for each block in the particular block set, create, by the first site, a metadata map using the metadata of the particular block-set, wherein the metadata map contains the metadata of each block specific to the replication request of the particular block set made by the second site,
pre-seed the metadata describing the particular block set from the first to the second site as the created metadata map, wherein the metadata describing the particular block set is pre-seeded from the first site to the second site prior to transferring any blocks of the particular block set requested by the second site,
determine, by the second site using the metadata map within a deduplication environment, data blocks corresponding to the pre-seeded metadata not currently stored at the second site by comparing the metadata of the created metadata map received from the first site of the metadata of only those blocks specific to the requested particular block set to metadata of a pre-calculated metadata map of all data stored at the second site, wherein the pre-calculated metadata map is created using deduplication metadata of all data stored at the second site and stored by the second site prior to receiving the replication request,
return, by the second site to the first site, a transfer request for the data blocks, wherein returning the transfer request includes compressing a list of the data blocks determined as not currently stored at the second site and transmitting the compressed list, by the second site to the first site, as an updated replication request,
responsive to the transfer request, transfer, from the first site to the second site, only original data blocks of the data blocks associated with the particular block-set determined as not currently stored at the second site as identified by the metadata map by the second site, thereby reducing bandwidth utilization during a replication operation of the particular block-set between the first and second site, and
subsequent to transferring the data blocks from the first to the second site, reexamine, by the second site, the assembled metadata map received from the first site as compared to the pre-calculated metadata map at the second site to determine if each of the data blocks were transferred.

5. The system of claim 4, wherein the one or more processors perform, by the second site, an analysis of all accessible data to the second site to determine the data blocks.

6. The system of claim 4, wherein the one or more processors if some of the data blocks are determined not to have been received by the second site, reissue a replication request to the first site for those data blocks determined not to have been received.

7. In a shared storage environment, a computer program product for managing data replication between first and second sites of a distributed computing environment by one or more processors, the computer program product comprising a non-transitory computer-readable storage medium having computer-readable program code portions stored therein, the computer-readable program code portions comprising:
an executable portion that receives, by the first site comprising a source storage, a replication request for a particular block set requested by a second site comprising a destination storage;
an executable portion that, responsive to receiving the replication request, generates metadata, by the first site, for each block in the particular block set, wherein the metadata generation is performed taking into account a predetermined block size for transferring the particular block set from the first site to the second site;
an executable portion that, responsive to generating the metadata for each block in the particular block set, creates, by the first site, a metadata map using the metadata of the particular block-set, wherein the metadata map contains the metadata of each block specific to the replication request of the particular block set made by the second site;
an executable portion that pre-seeds the metadata describing the particular block set from the first to the second site as the created metadata map, wherein the metadata describing the particular block set is pre-seeded from the first site to the second site prior to transferring any blocks of the particular block set requested by the second site;
an executable portion that determines, by the second site using the metadata map within a deduplication environment, data blocks corresponding to the pre-seeded metadata not currently stored at the second site by comparing the metadata of the created metadata map received from the first site of the metadata of only those blocks specific to the requested particular block set to metadata of a pre-calculated metadata map of all data stored at the second site, wherein the pre-calculated metadata map is created using deduplication metadata of all data stored at the second site and stored by the second site prior to receiving the replication request;
an executable portion that returns, by the second site to the first site, a transfer request for the data blocks, wherein returning the transfer request includes compressing a list of the data blocks determined as not currently stored at the second site and transmitting the compressed list, by the second site to the first site, as an updated replication request;
an executable portion that, responsive to the transfer request, transfers, from the first site to the second site, only original data blocks of the data blocks associated with the particular block-set determined as not currently stored at the second site as identified by the metadata map by the second site, thereby reducing bandwidth utilization during a replication operation of the particular block-set between the first and second site; and
an executable portion that, subsequent to transferring the data blocks from the first to the second site, reexamines, by the second site, the assembled metadata map received from the first site as compared to the pre-calculated metadata map at the second site to determine if each of the data blocks were transferred.

8. The computer program product of claim 7, further including an executable portion that performs, by the second site, an analysis of all accessible data to the second site to determine the data blocks.

9. The computer program product of claim 7, further including an executable portion that, if some of the data blocks are determined not to have been received by the second site, reissues a replication request to the first site for those data blocks determined not to have been received.

\* \* \* \* \*